F. G. BREUL.
CHAIN LINK.
APPLICATION FILED JULY 18, 1911.
1,034,868.
Patented Aug. 6, 1912.
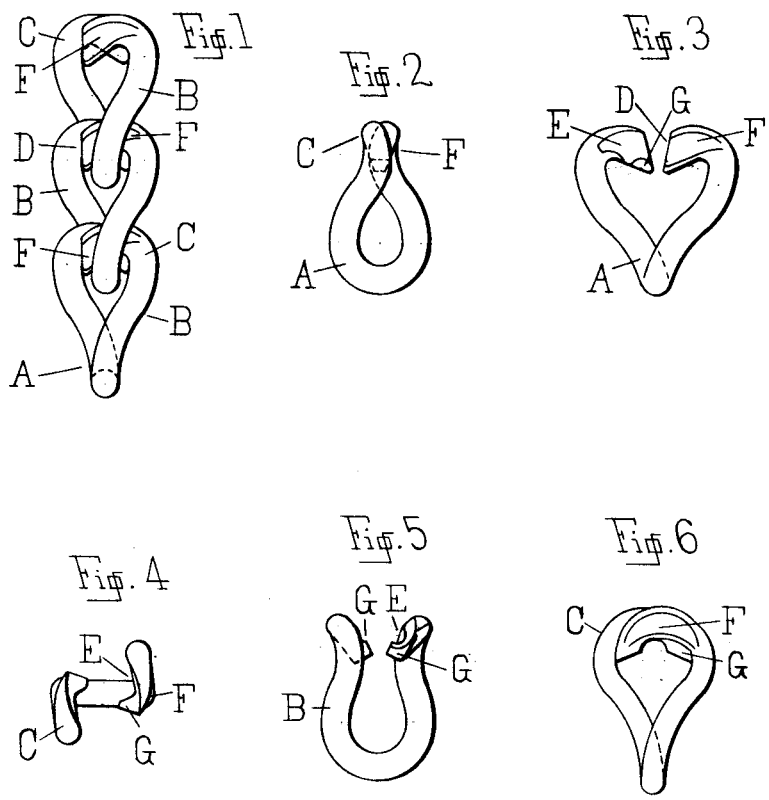
WITNESSES
Stephen Masek
Fred H. Niemes
Frederick G. Breul.
INVENTOR

UNITED STATES PATENT OFFICE.

FREDERICK G. BREUL, OF BRIDGEPORT, CONNECTICUT.

CHAIN-LINK.

1,034,868.  Specification of Letters Patent.  Patented Aug. 6, 1912.

Application filed July 18, 1911. Serial No. 639,146.

*To all whom it may concern:*

Be it known that I, FREDERICK G. BREUL, a citizen of the United States, residing at Bridgeport, in the county of Fairfield and State of Connecticut, have invented a new and useful Improvement in Chain-Links, of which the following is a specification.

My invention consists in a new locking arrangement of the ends of the wire from which the link is made, and it can be applied to variously shaped links, the usual styles of the common welded chain, and is well adapted for the production of short link twisted chain.
Chain made of links according to my invention possesses several important advantages over the welded chains. In the first place it is made of cold, hard drawn wire, the temper of which is therefore fully preserved, and chain of proportionately great tensile strength and long wearing capacity is produced, and furthermore all the links are of positively equal strength and resistance. As by any of the welding processes the temper of the wire is destroyed by the heat applied for the purpose, and as improper and defective welds often occur and cannot be avoided, the advantages I claim are evident. My links can also be readily opened, or spread apart for separation or connection, and quickly closed again into perfect shape and condition, by which feature no link may be lost for the use and application of short chain, and in many cases special attachment devices rendered unnecessary. This feature constitutes a special advantage not only over the welded, but also over the usual styles of cold manufactured chain links. Furthermore chain according to this invention can be manufactured rapidly by automatic machinery specially designed for the purpose.

I will now state how to make my link and describe its construction.
Referring to the accompanying drawings, Figure 1 shows several of the links connected together to form a chain, and Fig. 2 is a side view of such a link. Fig. 3 shows a link spread apart sidewise. Fig. 4 is an end view and Fig. 5 a side view of a link opened in the other direction and for the purpose of reclosing it, and Fig. 6 illustrates the application of my invention to a link of broader dimensions.
To construct a link according to Figs. 1 and 2 a wire blank is bent at its center to form a bow A, converging sides B, B, and hook shaped end portions C, C, crossing each other on their return bends, the wire ends extending beyond the crossing and toward the bow A. As shown in Figs. 1 and 3 the wire ends must be chamfered off to prevent undesirable spreading of the locked ends, and such chamfers, D, D, can be cut at any operative stage, but preferably after the bending of the end hooks C, C. As the next and final operation the crossing portions of these end hooks are subjected to a heavy pressure between suitable, oppositely located dies, and become embedded into each other by reason of perfectly coinciding recesses E, E, formed by this operation on their inner faces. By the same operation these crossing portions are considerably reduced in thickness and flattened on the outside, as shown by F, in Figs. 1 and 3 and as the metal contained in them becomes more highly tempered, the locking portions are considerably strengthened thereby. The extreme wire ends are by the same operation forced into the link inclosure, resting against it and extending along and parallel with the side shanks. As seen at G, Fig. 5, these ends are neither bent nor reduced in thickness by any of the operations.

While my links are preferably formed according to the foregoing description and process and the latter is further explained and claimed in a separate application for patent now pending, such links may also be made by first bending them to shape according to Fig. 3, then providing them with the recesses E, E, by properly shaped dies and thereafter bringing the hooks together for the proper engagement of the recesses E, E. Any such other procedure, however, of making links and chain with the herein described locking feature would be no departure from my invention.

It will be seen by the drawings that the interlocked crossing portions lay freely upon each other, are unbent except to conform to the general formation of the link, and can be spread apart as shown in Figs. 4 and 5, and be again brought together to form a perfectly shaped link of full tensile strength. While the hooks thus merely rest upon each other and in their recesses, the tensile strength of the link is not impaired thereby, as the bow A of the adjoining link of the chain forces them together at a ratio equivalent to the tensile strength it may become subjected to.

The broader link illustrated in Fig. 6 gives a more distinct conception of the position of the crossing hooks and disposition of the wire ends within the link inclosure, as they extend along the side shanks in the direction of loop A. In this link, it will be noted, the wire ends are chamfered on the opposite or inner side, so that the bow of the adjoining link may always slip freely to the center of the locked end.

I claim:

1. A chain link bent from a wire blank having end hooks crossing each other, provided with mutually engaging recesses on their inner mating faces, and having unbent wire ends of the original diameter of the blank situated in the link inclosure.

2. As an article of manufacture a chain consisting of links having crossing end hooks loosely and separably lying upon each other, the crossing portions being flattened and provided with coinciding recesses on their inner faces, the extreme wire ends being situated in the link inclosure and retaining the original thickness of the blank.

FREDERICK G. BREUL.

Witnesses:
STEPHEN MASEK,
FRED W. NIEMES.